(12) United States Patent
Yamane et al.

(10) Patent No.: US 12,264,260 B2
(45) Date of Patent: Apr. 1, 2025

(54) MULTILAYERED COATING FILM AND COATED ARTICLE

(71) Applicant: MAZDA MOTOR CORPORATION, Hiroshima (JP)

(72) Inventors: Takakazu Yamane, Hiroshima (JP); Keiichi Okamoto, Hiroshima (JP); Kouji Teramoto, Hiroshima (JP); Ryuji Nonaka, Hiroshima (JP); Kazuteru Tamai, Hiroshima (JP); Eiichi Kawase, Hiroshima (JP); Tomohiro Fujimoto, Hiroshima (JP); Takayoshi Nakamoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 18/252,176

(22) PCT Filed: Oct. 22, 2021

(86) PCT No.: PCT/JP2021/039153
§ 371 (c)(1),
(2) Date: May 8, 2023

(87) PCT Pub. No.: WO2022/102378
PCT Pub. Date: May 19, 2022

(65) Prior Publication Data
US 2024/0018365 A1    Jan. 18, 2024

(30) Foreign Application Priority Data
Nov. 13, 2020    (JP) ................. 2020-189702

(51) Int. Cl.
*C09D 5/03*    (2006.01)
*C09D 7/40*    (2018.01)
*C09D 7/61*    (2018.01)

(52) U.S. Cl.
CPC ............. *C09D 5/031* (2013.01); *C09D 5/035* (2013.01); *C09D 7/61* (2018.01); *C09D 7/67* (2018.01); *C09D 7/68* (2018.01); *C09D 7/69* (2018.01)

(58) Field of Classification Search
None
See application file for complete search history.

(56) References Cited

U.S. PATENT DOCUMENTS

2013/0048501 A1* 2/2013 Yamane ................. B05D 7/577
                                                            205/50
2016/0354805 A1* 12/2016 Fujiwara ................ B05D 7/572
(Continued)

FOREIGN PATENT DOCUMENTS

JP    2002-273332 A    9/2002
JP    2005-177541 A    7/2005
(Continued)

OTHER PUBLICATIONS

Hollman (Decorative and Functional Metallic Effect Pigments; www.pcimag.com; Apr. 4, 2016) (Year: 2016).*
(Continued)

*Primary Examiner* — Ronak C Patel
(74) *Attorney, Agent, or Firm* — Studebaker Brackett PLLC

(57) ABSTRACT

A multilayer coating film includes a lustrous layer containing a luster material and a colored layer containing a reddish coloring agent, and having translucency. Regarding a Y value of an XYZ colorimetric system calibrated with a standard white plate, when a light incident angle is 45°, Y(5°) represents a Y value of reflected light measured at a light receiving angle of 5°, and Y(15°) represents a Y value of reflected light measured at a light receiving angle of 15°, the lustrous layer satisfies the following: Y(5°) is 30 or more to 700 or less; Y(15°)=k×Y(5°) (where k is a coefficient);
(Continued)

and k is 0.01 or more to 0.3 or less. The concentration of the reddish coloring agent in the colored layer is 1 mass % or more to 17 mass % or less.

20 Claims, 8 Drawing Sheets

(56) References Cited

U.S. PATENT DOCUMENTS

| | | | |
|---|---|---|---|
| 2017/0218206 A1* | 8/2017 | Yamane | C23C 14/5886 |
| 2019/0047270 A1 | 2/2019 | Yamane et al. | |
| 2019/0099781 A1* | 4/2019 | Yamane | B05D 5/06 |
| 2020/0354589 A1 | 11/2020 | Yamanaka et al. | |

FOREIGN PATENT DOCUMENTS

| | | |
|---|---|---|
| JP | 2006-281451 A | 10/2006 |
| JP | 2012-232236 A | 11/2012 |
| WO | 2018/061215 A1 | 4/2018 |
| WO | 2018/061216 A1 | 4/2018 |
| WO | 2018/143219 A1 | 8/2018 |

OTHER PUBLICATIONS

English translation of Kato et al. (DE 112015003694). (Year: 2017).*
International Search Report issued in PCT/JP2021/039153; mailed Dec. 28, 2021.

* cited by examiner

MULTILAYERED COATING FILM AND COATED ARTICLE

TECHNICAL FIELD

The present disclosure relates to a multilayer coating film including a lustrous layer (a metallic base layer) containing a luster material and a colored layer (a color clear layer), formed on the lustrous layer, containing a pigment and having translucency, and to a coated article including the multilayer coating film.

BACKGROUND ART

In recent years, there has been a demand for producing a coating color having a high chroma of highlight and a deep depth for a coating target which is required to have a high design, such as a motor vehicle.

Patent Document 1 relates to a molding multilayered sheet useful for, e.g., a motor vehicle-related member, and describes that a design with depth is obtained. In the multilayered sheet in which a colored layer is stacked on a metallic gloss layer, the lightness L* of light penetrating the colored layer is set to 20 to 80, the gloss value of the metallic gloss layer is set to 200 or more, and the chroma C* of specular reflected light at 45 degrees is set to 150 or more. This document also indicates that aluminum flakes are added to the metallic gloss layer and perylene red is employed as a pigment in the colored layer.

Patent Document 2 describes that FF properties are improved and a high-design metallic color is produced in a multilayer coating film having a warm color produced by a lustrous layer directly or indirectly formed on a surface of a coating target and containing a luster material and a colored layer stacked on the lustrous layer, containing a warm color pigment, and having translucency. In the above-described multilayer coating film, the lustrous layer has a Y value of an XYZ colorimetric system calibrated with a standard white plate. When a light incident angle is 45°, the Y value of reflected light measured at a light receiving angle of 10° is Y(10°), and the Y value of reflected light measured at a light receiving angle of 25° is Y(25°), Y(10°) is 50 or more to 950 or less, Y(25°)=k×Y(10°) (where k is a coefficient), k=0.05 or more to 0.35 or less, and the warm color pigment concentration C of the colored layer is 1 mass % or more to 17 mass % or less.

Patent Document 3 describes a multilayer coating film formation method which can be applied to various industrial products, particularly outer panels of motor vehicles, and which can form a coating film having high lightness and chroma in a highlight (in the vicinity of specular reflected light), having a high chroma in a shade (in an oblique direction), having a great difference in lightness between the highlight and the shade, and having a uniform finished design. In this method, a first color clear coating film is formed on a metallic base coating film obtained by applying a metallic base paint containing a coloring pigment and a scaly bright pigment, and a second color clear coating film is further formed thereon. The same coloring pigment is contained in the first and second color clear coating films. The concentration of the coloring pigment per unit film thickness in the first and second color clear coating films is within a range of 30/70 to 60/35 in terms of the ratio of the former to the latter.

CITATION LIST

Patent Documents

Patent Document 1: Japanese Unexamined Patent Publication No. 2006-281451
Patent Document 2: International Patent Publication No. WO 2018/061215
Patent Document 3: Japanese Unexamined Patent Publication No. 2012-232236

SUMMARY

Technical Problem

It is high flip-flop properties (hereinafter referred to as "FF properties") that give metallic impression to a metallic coating provided, for example, on a vehicle body. With the FF properties, the lightness of the coated article varies depending on an angle from which the coated article is viewed. That is, as the contrast between the lightness (i.e., highlight) and the darkness (i.e., shade) increases, the FF properties increase and better metallic impression is obtained. The FF properties are often represented by a flop index (FT) value which is a metallic appearance index provided by X-Rite, Incorporated. However, the FI values obtained so far in metallic coatings are about 18, in general, and stunning, enhanced metallic impression has not been achieved yet.

Briefly saving, the FI value expresses the degree of lightness of the highlight (when viewed from the vicinity of the specular reflection angle) with reference to the lightness of the shade, and therefore, the FI value is small if the lightness of the highlight is low. On the other hand, if the amount of luster material is increased in order to increase the lightness of the highlight, diffused reflection due to the luster material increases, and at the same time, the lightness of the shade increases, as well. That means that significant FF properties cannot be achieved.

It is an object of the present disclosure to improve FF properties and produce a high-design metallic color in a multilayer coating film having the reddish color produced by a lustrous layer and a colored layer having translucency.

Solution to the Problems

In order to solve the above-described problem, the present disclosure has focused on a relationship between reflection properties of the lustrous layer and the concentration of a reddish coloring agent in the colored layer.

The multilayer coating film disclosed herein includes a lustrous layer directly or indirectly formed on a surface of a coating target and containing a luster material, and a colored layer stacked on the lustrous layer, containing a reddish coloring agent, and having translucency. Regarding a Y value of an XYZ colorimetric system calibrated with a standard white plate, when a light incident angle (an angle with respect to a line perpendicular to a surface of the lustrous layer) is 45°, Y(5°) represents a Y value of reflected light measured at a light receiving angle (the angle of inclination toward a light source side from a specular reflection direction) of 5°, and Y(15°) represents a Y value of reflected light measured at a light receiving angle of 15°, the lustrous layer satisfies the following: Y(5°) is 30 or more to 700 or less; Y(15°)=k×Y(5°) (where k is a coefficient);

and k is 0.01 or more to 0.3 or less. The concentration of the reddish coloring agent in the colored layer is 1 mass % or more to 17 mass % or less.

In a multilayer coating film having the reddish color produced by a lustrous layer and a colored layer having translucency, reflected light from a luster material contained in the lustrous layer penetrates the colored layer, and accordingly, a coloring agent (pigment and/or dye) contained in the colored layer produces a vivid color. The higher a lightness in a highlight and the lower a lightness in a shade, the more vivid red can be produced in the highlight. Thus, a sufficient darkness of the shade can be obtained. Consequently, the FF properties are enhanced, and a high-design metallic color can be produced.

The Y value of the XYZ colorimetric system is a stimulus value indicating luminance (luminous reflectance). $Y(5°)$ is an index of a lustrous impression of highlights. $Y(15°)$ is an index of whether or not the hue of the reddish coloring agent clearly appears at an observation angle slightly shifted from a highlight direction. When $Y(5°)$ is 30 or more to 700 or less and k in $Y(15°)=k \times Y(5°)$ is 0.01 or more to 0.3 or less, the coloring agent of the colored layer is vividly colored by the reflected light from the lustrous layer, the hue of the coloring agent clearly appears, and the FF properties are also enhanced.

However, it is difficult to sufficiently increase the FI value only by setting the reflection properties of the lustrous layer as described above. This is because if the amount of the luster material is increased in order to increase the lightness of the highlight, the amount of light in a shade direction increases due to diffused reflection (irregular reflection) of incident light due to fine asperities or edges of the surface of the luster material, and accordingly, the lightness of the shade also increases.

For this reason, in the present disclosure, the reflection properties of the lustrous layer and the light transparency of the colored layer are combined in order to increase the FI value. That is, an important feature of the present disclosure is that a great FI value of the multilayer coating film is obtained by the combination of the reflection properties of the lustrous layer and the light transparency of the colored layer.

Specifically, the light transparency of the colored layer varies depending on the concentration of the coloring agent contained in the colored layer. If the concentration of the reddish coloring agent in the colored layer is low, the hue of the reddish color is not sufficiently produced. If the concentration of the coloring agent is low, the reflected light from the lustrous layer, particularly the diffuse-reflected light, is not attenuated much when penetrating the colored layer, and the lightness of the shade increases. Accordingly, the FI value decreases. On the other hand, if the concentration of the coloring agent is 1 mass % or more, the hue of the reddish color can be sufficiently produced, and the diffuse-reflected light is sufficiently absorbed by the coloring agent when penetrating the colored layer. Thus, the lightness of the shade decreases, and the FI value increases. If the concentration of the coloring agent is excessively high, an effect of the coloring agent absorbing and/or shielding the reflected light from the lustrous layer increases, and the lightness of the highlight decreases. Accordingly, the FI value decreases. In a case where the coloring agent is a pigment, light scattering due to pigment particles also causes an increase in the lightness of the shade and therefore causes a decrease in the FI value. Thus, the upper limit of the concentration of the coloring agent is preferably 17 mass %.

$Y(5°)$ is preferably 150 or more to 500 or less, more preferably 200 or more to 400 or less, particularly preferably 200 or more to 300 or less. Moreover, k is preferably 0.03 or more to 0.2 or less, more preferably 0.05 or more to 0.15 or less. The concentration of the reddish coloring agent is preferably 4 mass % or more to 10 mass % or less, more preferably 5 mass % or more to 9 mass % or less, particularly preferably 5 mass % or more to 7 mass % or less.

Preferably, the lustrous layer contains, as the luster material, aluminum flakes having an average particle size of 5 μm or more to 30 μm or less and an average thickness of 10 nm or more to 500 nm or less, and the concentration of the aluminum flakes in the lustrous layer is 1 mass % or more to 17 mass % or less.

Since these aluminum flakes have a visible light reflectance of about 90% or more, the amount of light in the highlight direction can be sufficiently ensured, and a sufficient lightness of the highlight can be obtained. Particularly, diffused reflection on the edges of the aluminum flakes is higher as the thicknesses of the flakes increase, but since the thicknesses of the aluminum flakes are small as described above, the intensity of the diffused reflection can be weakened. Thus, the lightness of the shade can be decreased.

If the concentration of the aluminum flakes is less than 1 mass %, the amount of light reflected by the aluminum flakes is insufficient, and a sufficient lightness of the highlight cannot be obtained. If the concentration of the aluminum flakes exceeds 17 mass %, influence of the diffused reflection due to the fine asperities and edges of the surface of the aluminum flakes is great, and the lightness of the shade is too high. The concentration of the aluminum flakes is set within the above-described range so that a great FI value can be obtained while a sufficient darkness of the shade is ensured. The concentration of the aluminum flakes is preferably 5 mass % or more to 12 mass % or less.

Preferably, the aluminum flakes have a surface roughness Ra of 50 nm or less.

The diffused reflection due to the fine asperities of the surfaces of the aluminum flakes causes an increase in the lightness of the shade. The surface roughness Ra of the aluminum flakes is set within the above-described range so that the diffused reflection can be reduced, and therefore, the lightness of the shade can be decreased.

Examples of the reddish coloring agent in the colored layer may include a reddish pigment excellent in weather resistance and/or a reddish dye excellent in transparency. From the viewpoint of ensuring a sufficient weather resistance of the multilayer coating film, the reddish pigment can be preferably employed.

The reddish pigment to be used may preferably include an organic pigment such as perylene red, dibromoanthanthrone red, azo red, anthraquinone red, quinacridone red, or diketopyrrolopyrrole.

Preferably, the colored layer contains a reddish pigment as the reddish coloring agent, and an inclination of a tangent to a spectrum of a spectral transmittance, defined as an absolute value, of the colored layer at the wavelength of 620 nm is 0.02 $nm^{-1}$ or more and 0.06 $nm^{-1}$ or less, the spectral transmittance being obtainable by dividing a spectral reflectance measured for the colored layer stacked on the lustrous layer at the light receiving angle of 15° in the case of the light incident angle of 45°, by a spectral reflectance measured for the lustrous layer from which the colored layer is removed and a surface of which is therefore exposed, at the light receiving angle of 15° in the case of the light incident angle of 45°.

The present inventors have found that the slope of the tangent of the spectral transmittance spectrum at 620 nm is proportional to a chroma C*. The higher the chroma C* is, the more development of red color is improved. Since the slope of the tangent is 0.02 $nm^{-1}$ or more to 0.06 $nm^{-1}$ or less, a sufficient chroma C* can be obtained, and therefore, vivid red is produced with less dullness and higher transparency.

The light receiving angle in the measurement of the spectral reflectance in order to obtain the spectral transmittance spectrum of the colored layer is 15o at which the red hue appears clearly. In the case of the reddish coloring agent, the spectral reflectance rises in a wavelength range of 590 nm to 650 nm, and therefore, the slope of the tangent of the spectrum at a median of 620 nm in the wavelength range is set. The slope of the tangent of the spectral transmittance spectrum at 620 nm is preferably 0.03 $nm^{-1}$ or more to 0.06 $nm^{-1}$ or less.

According to this configuration, the combination of the light transparency of the colored layer and the reflection properties of the lustrous layer allows the color of red to be vividly and brightly produced with transparency in the highlight while the lightness decreases on the shade side, whereby the color of red in the highlight becomes more conspicuous. Thus, it is advantageous in producing a high-design metallic color.

Preferably, the average particle size of the reddish pigment is 2 nm or more to 160 nm or less.

Since the average particle size of the pigment particles of the reddish pigment (in this specification, the "average particle size of the pigment particles" will also be referred to as the "pigment particle size") of the pigment particles of the reddish pigment is 160 nm or less, there is no geometric optical scattering or Mie scattering due to the pigment particles. Since the average particle size is 2 nm or more, Rayleigh scattering is also avoided. Thus, it is advantageous in producing clear and vivid red. In addition, the pigment particle size is small, and therefore, if the same pigment concentration is applied, the frequency of light contacting the pigment particles and being absorbed by the pigment particles when the light penetrates the colored layer is higher than that in a case where the pigment particle size is large. Thus, the light is more greatly attenuated. When the light attenuation increases, the amount of light penetrating the colored layer decreases, and the overall lightness decreases. However, since the amount of light in the highlight direction is originally great, influence of the light attenuation on the lightness is small. On the other hand, since the amount of light in the shade direction is originally small, the influence of the light attenuation on the lightness is great. The size of the pigment particles is reduced, and a great FI value is obtained. Thus, it is advantageous in obtaining a high level of metallic impression. The average particle size of the reddish pigment is more preferably 2 nm or more to 30 nm or less.

Preferably, the colored layer further contains a blackish coloring agent.

According to this configuration, the light reflected on the luster material of the lustrous layer is absorbed by the blackish coloring agent over the entire wavelength when the reflected light penetrates the colored layer. Since the amount of light is small in the shade direction, the amount of reflected light penetrating the colored layer is greatly reduced when the light is absorbed by the blackish coloring agent. On the other hand, since the amount of reflected light is great in the highlight, the amount of reflected light penetrating the colored layer is sufficiently ensured even if part of the reflected light is absorbed by the blackish coloring agent. Thus, a coated article provided with the multilayer coating film looks jet-black in the shade while looking vivid red in the highlight, and a high-design metallic color is produced.

Preferably, the concentration of the blackish coloring agent in the colored layer is 6 mass % or less.

If the concentration of the blackish coloring agent is too high, the amount of reflected light absorbed increases, and therefore, the blackness of the highlight excessively increases and the color of red in the highlight dulls. According to this configuration, the concentration of the blackish coloring agent is set within the above-described range so that an excessive increase in the blackness of the highlight can be suppressed and the dullness of the color of red can be reduced. Accordingly, vivid red in the highlight can be produced.

Preferably, the percentage of the blackish coloring agent with respect to the total of the reddish coloring agent and the blackish coloring agent in the colored layer is 26 mass % or less.

If the concentration of the blackish coloring agent in the coloring agent is too high, the blackness of the highlight also excessively increases, leading to the dullness of the color of red in the highlight. According to this configuration, an excessive increase in the blackness of the highlight can be suppressed and the dullness of the color of red can be reduced. Thus, it is advantageous in producing vivid red in the highlight.

The coated article including the multilayer coating film provided on a coating target is, for example, a body of a motor vehicle. The coated article may also be a body of a motorcycle or bodies of other vehicles, or may be other metal products or plastic products.

The multilayer coating film and the coated article of the present disclosure may have the following configurations.

The lustrous layer preferably contains a blackish coloring agent.

If the light diffuse-reflected on the fine asperities or edges of the surface of the luster material or a base (e.g., electrodeposition coating film) penetrates the colored layer, the amount of light in the shade direction increases, and the lightness of the shade increases. If the lightness of the shade has increased, the whiteness of the shade increases, which causes the red color in the highlight to be blurred.

In this configuration, since the blackish coloring agent is contained in the lustrous layer, most of incident light penetrating a gap among particles of the bright material in the lustrous layer is absorbed and/or shielded by the blackish coloring agent, and therefore, almost no reflection on the base occurs. The light diffuse-reflected on the fine asperities or edges of the surface of the luster material is absorbed and/or shielded by the blackish coloring agent, and the lightness of the shade decreases accordingly.

Examples of the blackish coloring agent in the lustrous layer include a blackish pigment excellent in weather resistance and/or a blackish dye excellent in transparency. From the viewpoint of ensuring a sufficient weather resistance of the multilayer coating film, the blackish pigment can be employed. Examples of the blackish pigment include carbon black, chromium oxide, iron oxide, manganese oxide, and a black indigoid pigment.

If the blackish coloring agent contained in the lustrous layer is carbon black, the concentration of the carbon black in the lustrous layer is preferably 1 mass % or more to 20 mass % or less.

If the concentration of the carbon black is too low, the light absorbing function and the light hiding power might not be sufficiently obtained. On the other hand, if the concentration of the carbon black is too high, a structure formed of aggregated primary particles is likely to be in a mechanically entangled state, and light scattering increases. For this reason, transparency might be degraded, and the lightness of the shade might increase. Thus, the concentration of the carbon black in the lustrous layer is set within the above-described range, and it is advantageous in decreasing the lightness of the shade.

The average particle size of the carbon black is preferably 200 nm or less.

According to this configuration, since the average particle size of the carbon black is ½ of the lower wavelength limit (a wavelength of 400 nm) of visible light, light scattering due to particles of the carbon black can be reduced.

The lustrous layer may contain, as a coloring agent, a coloring agent other than the blackish coloring agent, such as a reddish coloring agent. Accordingly, light scattering can be reduced. From the viewpoint of a great FI value, only the blackish coloring agent is preferably contained as the coloring agent.

For the lustrous layer, when a light incident angle (an angle with respect to a line perpendicular to the surface of the lustrous layer) is 45° and $L^*(\theta)$ represents the $L^*$ value of the lightness index of reflected light measured at a light receiving angle (the angle of inclination toward a light source side from a specular reflection direction) $\theta$, $L^*(\theta)$ at $45°\leq\theta\leq 80°$ and $100°\leq\theta\leq 110°$ is preferably 10 or less.

The lightness in the shade direction ($45°\leq\theta\leq 80°$ and $100°\leq\theta\leq 110°$) is set to 10 or less, and therefore, a sufficient darkness of the shade can be ensured. $L^*(\theta)$ at $45°\leq\theta\leq 80°$ and $100°\leq\theta\leq 110°$ as described above is preferably 5 or less. Particularly, $L^*(\theta)$ at $45°\leq\theta\leq 80°$ and $100°\leq\theta\leq 110°$ is preferably 10 or less in a case where the lustrous layer contains the blackish coloring agent and the reddish coloring agent, and is preferably 5 or less in a case where the lustrous layer contains only the blackish coloring agent.

When the luster material is projected onto the bottom surface of the lustrous layer, the percentage of the projected area of the luster material on the bottom surface is preferably 3% or more to 70% or less per unit area.

If the percentage of the projected area of the luster material is less than the lower limit, the amount of light reflected by the luster material is insufficient, and a sufficient lightness of the highlight cannot be obtained. On the other hand, if the percentage of the projected area of the luster material exceeds the upper limit, the amount of luster material contained in the lustrous layer is great, and for this reason, influence of the diffused reflection due to the fine asperities or edges of the surface of the luster material is great. Thus, the lightness of the shade is too high. The percentage of the projected area of the luster material is set within the above-described range so that a great FI value can be obtained while a sufficient darkness of the shade is ensured. The percentage of the projected area of the luster material is preferably 20% or more to 50% or less per unit area.

The spectral reflectance, which is measured at a light incident angle of 45° and a light receiving angle of 45° and 110°, of the lustrous layer for a standard white plate in a wavelength range of 450 nm to 700 nm is preferably 0.02 or less in absolute value.

Accordingly, a sufficient darkness of the shade can be obtained. Particularly, the spectral reflectance is preferably 0.02 or less in a case where the lustrous layer contains the blackish coloring agent and the reddish coloring agent, and is preferably 0.01 or less in a case where the lustrous layer contains only the blackish coloring agent.

A transparent clear layer is preferably layered directly on the lustrous layer. The resistance to acids and scratches can be obtained by the transparent clear layer.

Advantages of the Invention

According to the present disclosure, in the lustrous layer, $Y(5°)$ is 30 or more to 700 or less, $Y(15°)$ is 0.01 times or more to 0.3 times or less as large as $Y(5°)$, and the concentration of the reddish coloring agent in the colored layer is 1 mass % or more to 17 mass % or less. Thus, the combination of the reflection properties of the lustrous layer and the light transparency of the colored layer allows the reflected light from the lustrous layer to produce vivid red color in the colored layer in the vicinity of the highlight, and a great FI value of the multilayer coating film can be obtained, which is advantageous in producing a high-design metallic color with both high vividness and depth.

DESCRIPTION OF EMBODIMENTS

Embodiments of the present disclosure will now be described with reference to the drawings. The following description of the embodiments is merely an example in nature, and is not intended to limit the scope, applications, or use of the present disclosure.

<Example Configuration of Multilayer Coating Film>

Figure 1:
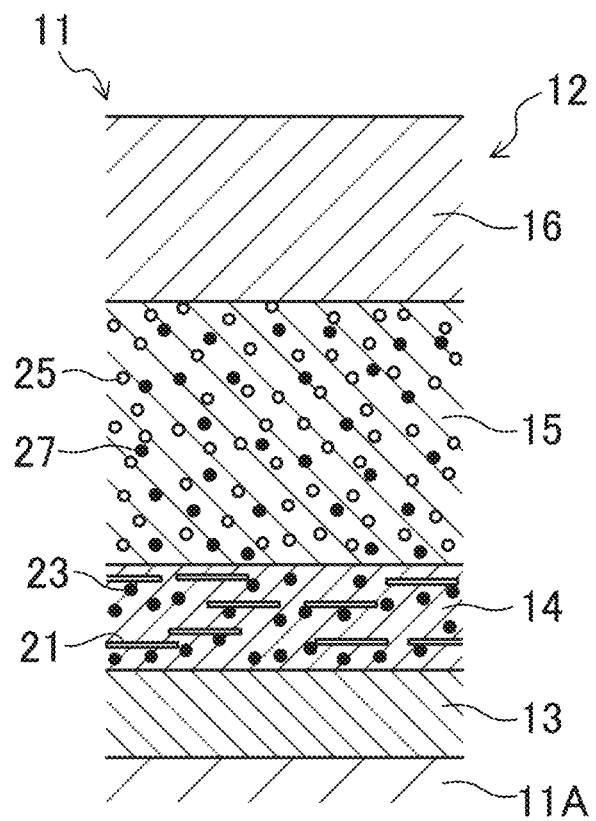
FIG. 1 is a cross-sectional view schematically illustrating a multilayer coating film.

As illustrated in FIG. 1, a vehicle body 11 (coated article) of a motor vehicle of the present embodiment includes a multilayer coating film 12 provided on a surface of a steel plate 11A (coating target) via an electrodeposition coating film 13. The multilayer coating film 12 is formed in such a manner that a lustrous layer 14, a colored layer 15 having translucency, and a transparent clear layer 16 are layered in this order. The electrodeposition coating film 13 is formed in advance on the surface of the steel plate 11A by cationic electrodeposition coating.

The lustrous layer 14 contains a resin component which is a base material, a luster material 21, and a first blackish pigment 23 which is a blackish coloring agent. The colored layer 15 contains a resin component which is a base material, a reddish pigment 25 which is a reddish coloring agent, and a second blackish pigment 27 which is a blackish coloring agent.

Although not limited thereto, the resin components to be employed for the lustrous layer 14 and the colored layer 15 may be, for example, any of acrylic-based resin, polyester resin, urethane resin, and melamine resin alone, or combination of them. The resin component to be employed for the transparent clear layer 16 may be, for example, carboxylic acid group-containing acrylic resin, a combination of polyester resin and epoxy-containing acrylic resin, and a combination of acrylic resin and/or polyester resin and polyisocyanate.

The lustrous layer 14 and the colored layer 15 may further contain an additive such as a UV shielding material, a viscous material, a thickening material, a pigment dispersant, or a surface adjustment material, as necessary. Particularly, from the viewpoint of the light resistance of the multilayer coating film 12, the multilayer coating film 12 preferably contains an UV shielding material. The UV shielding material to be employed may be an organic compound-based ultraviolet absorber or an inorganic compound-based ultraviolet scattering agent, and among them, nanoparticles of metal oxide such as iron oxide are preferably employed.

The lustrous layer 14 preferably has a thickness of 6 μm or more to 15 μm or less, more preferably 7 μm or more to 13 μm or less, and the colored layer 15 preferably has a thickness of 8 μm or more to 15 μm or less.

The surface roughness Ra of the electrodeposition coating film 13 is preferably 2.0 μm or less, more preferably 1.0 μm or less. Accordingly, the orientation of the luster material 21 of the lustrous layer 14 is improved.

<Lustrous Layer>
[Luster Material]

As the luster material 21 contained in the lustrous layer 14, metal flakes having a high visible light reflectance may be employed. In the present embodiment, aluminum flakes are employed as the luster material 21.

The aluminum flakes preferably have a visible light reflectance of 90% or more from the viewpoint of obtaining a sufficient lightness of a highlight. Accordingly, the amount of light in a highlight direction can be sufficiently ensured, and a sufficient lightness of the highlight can be obtained.

Specifically, these aluminum flakes have an average particle size of 5 μm or more to 30 μm or less, preferably 10 μm or more to 15 μm or less, and preferably have an average thickness of 10 nm or more to 500 nm or less. Particularly, the average thickness is preferably 10 nm or more to 50 nm or less in the case of evaporated aluminum flakes and 100 nm or more to 500 nm or less in the case of thin aluminum flakes.

In this specification, the average particle sizes of the luster material 21 and various coloring pigments may be determined by determining D50, which is a value of the particle size at 50% in particle size distribution measured by, for example, a laser diffraction type particle size distribution measurement device.

As for the average thickness of the luster material 21, the thicknesses of a plurality of particles (e.g., 50 particles) of the luster material 21 are measured through, for example, observation with a scanning electron microscope, and the average thereof is taken as the average thickness.

If the average particle size is too small, reflection properties might be degraded. If the average particle size is too large, excellent reflection properties are exhibited, but the appearance might be too granular. Diffused reflection on the edge of the aluminum flake is higher as the thickness of the flake increases, but since the thickness is small as described above, the diffused reflection is weak. This is advantageous in reducing the lightness of a shade.

The aspect ratio (average particle size/average thickness) of the aluminum flake is preferably 30 or more to 300 or less.

The aluminum flakes preferably have a surface roughness Ra of 50 nm or less. Particularly, the surface roughness Ra is preferably 7 nm or less in the case of evaporated aluminum flakes and 50 nm or less in the case of smooth aluminum flakes. Accordingly, the diffused reflection due to fine asperities of the surface of the aluminum flake can be reduced, and therefore, the lightness of the shade can be reduced.

In order to increase the lightness of the highlight, the luster material 21 is oriented substantially parallel with the surface of the lustrous layer 14 (such that the average orientation angle of the luster material 21 with respect to the surface of the lustrous layer 14 is 1.2 degrees or less). For example, after having applied a paint, which contains the luster material 21, the first blackish pigment 23, etc., on top of the electrodeposition coating film 13, a solvent contained in the coating film is vaporized by stoving. As a result, the coating film shrinks in volume and becomes thin, and the luster material 21 is arranged at an average orientation angle of 1.2 degrees or less. The average orientation angle of the luster material 21 is obtained as follows: the inclinations of a plurality of particles (for example, 50 particles) of the luster material 21 included in a single visual field with respect to the surface of the lustrous layer 14 are calculated from 3D shape data (xyz coordinates) measured on the surface of the lustrous layer 14 with a laser microscope (VK-X1000 manufactured by KEYENCE CORPORATION), and are averaged.

There are two types of aluminum flakes, i.e., a leafing type and a non-leafing type, and either type may be used. However, the non-leafing type aluminum flakes are preferably used.

The leafing type aluminum flakes have a low surface tension. For this reason, in a case where a paint containing the leafing type aluminum flakes is applied, the aluminum flakes float on the surface of the lustrous layer 14, and are oriented parallel with the surface. When the aluminum flakes float on the surface of the lustrous layer 14, the amount of reflected light increases and FF properties are enhanced, but strong flat gloss, such as specular reflection is obtained. In addition, in the case of the leafing type aluminum flakes, a surface area is small, and the amount of resin component on the surface of the lustrous layer 14 is decreased. For this reason, there is a problem in which adhesiveness between the lustrous layer 14 and the colored layer 15 is degraded and peeling easily occurs due to an external factor such as chipping.

On the other hand, the non-leafing type aluminum flakes have a high surface tension. For this reason, in a case where a paint containing the non-leafing type aluminum flakes is applied, the aluminum flakes are oriented parallel with the surface of the lustrous layer 14 and are irregularly dispersed in a film thickness direction, as illustrated in, e.g., FIG. 1. Accordingly, the amount of reflected light changes in accordance with the positions of the aluminum flakes in the film thickness direction, and therefore, three-dimensional metallic gloss can be obtained and a high-design metallic color can be obtained. In addition, in the case of the non-leafing type aluminum flakes, the amount of resin component on the surface of the lustrous layer 14 can be sufficiently ensured, and therefore, sufficient adhesiveness between the lustrous layer 14 and the colored layer 15 can be ensured.

[Area Ratio of Luster Material]

When the luster material 21 is projected onto the bottom surface of the lustrous layer 14, the percentage (also referred to as an "area ratio" in this specification) of the projected area of the luster material 21 on the bottom surface is preferably 3% or more to 70% or less, more preferably 20% or more to 50% or less per unit area.

If the area ratio of the luster material 21 is too low, the amount of light reflected by the luster material 21 is insufficient, and a sufficient lightness of the highlight cannot be obtained. On the other hand, if the area ratio of the luster material 21 is too high, the amount of luster material 21 is great, and for this reason, influence of the diffused reflection due to the fine asperities and edges of the surface of the luster material 21 is great. Thus, the lightness of the shade increases, and the strength and weather resistance of the lustrous layer 14 decrease. The area ratio of the luster material 21 is set within the above-described range so that a great FT value and sufficient strength and weather resistance can be obtained while a sufficient darkness of the shade is ensured.

The area ratio of the aluminum flakes per unit area is obtained, for example, in such a manner that the lustrous layer 14 is observed from the surface thereof under magnification with a microscope and the area ratios of the aluminum flakes in a plurality of visual fields (for example, 10 visual fields) are calculated by image processing and are averaged.

Figure 2:
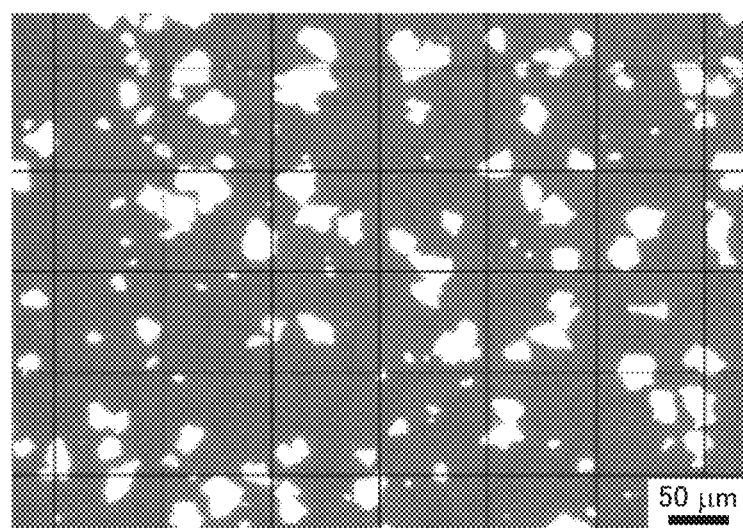
FIG. 2 is a photograph of a lustrous layer of Manufacturing Example 1 taken from the front surface side thereof.

Specifically, FIG. 2 is a photograph of a lustrous layer according to Manufacturing Example 1 shown in Table 1, and the photograph is taken from the front surface side thereof. Manufacturing Example 1 is a coated plate for which aluminum flakes are used as the luster material 21, carbon black is used as the first blackish pigment 23, and acrylic resin, urethane resin, and melamine resin are used as the resin components and in which only the lustrous layer 14 is provided on the surface of the steel plate 11A via the electrodeposition coating film 13.

TABLE 1

| | | | Manufacturing Example 1 |
|---|---|---|---|
| Lustrous Layer | Aluminum Flakes | Concentration (mass %) | 6 |
| | | Area Ratio (%) | 22.5 |
| | | Average Particle Size (μm) | 12 |
| | | Average Thickness (μm) | 0.14 |
| | | Surface Roughness Ra (nm) | 30 |
| | | Average Orientation Angle (°) | 1 |
| | Carbon Black | Concentration (mass %) | 10.8 |
| | | Average Particle Size (μm) | 100 |

TABLE 1-continued

| | | Manufacturing Example 1 |
|---|---|---|
| Acrylic Resin | Concentration (mass %) | 16.7 |
| Urethane Resin | Concentration (mass %) | 16.3 |
| Melamine Resin | Concentration (mass %) | 12.3 |
| Additive | Concentration (mass %) | 37.9 |

Whitish particles in FIG. 2 are the aluminum flakes. From this figure, the area ratio of the aluminum flakes occupying the bottom surface of the lustrous layer 14 when the aluminum flakes are projected onto the bottom surface can be calculated as 22.5% per unit area.

The area ratio of the luster material 21 as described above can be obtained, for example, by setting the concentration of the luster material 21 in the lustrous layer 14 to preferably 1 mass % or more to 17 mass % or less, more preferably 5 mass % or more to 12 mass % or less. If the concentration of the luster material 21 is less than 1 mass %, a sufficient area ratio of the luster material 21 cannot be obtained. If the concentration of the luster material 21 exceeds 17 mass %, the area ratio of the luster material 21 is too high.

[First Blackish Pigment]

Although the flake-like luster material 21 is effective in increasing the lightness of the highlight, not only the diffused reflection due to the fine asperities of the flake surface and the diffused reflection at the flake edges, but also diffused reflection on a base (the electrodeposition coating film 13 in the present embodiment) occur. If such diffuse-reflected light penetrates the colored layer 15, the amount of light in a shade direction increases, and the lightness of the shade increases. If the lightness of the shade has increased, the whiteness of the shade increases, which causes the red color in the highlight to be blurred and the vividness of the red color to be lowered. For this reason, it is preferable that the first blackish pigment 23 as the blackish coloring agent is contained in the lustrous layer 14 and the reflection properties of the shade are adjusted using the light absorbing function and light hiding power of the first blackish pigment 23.

Most of incident light penetrating a gap among the particles of the luster material 21 is absorbed and/or shielded by the first blackish pigment 23, and therefore, almost no diffused reflection on the base (electrodeposition coating film 13) occurs. The light diffuse-reflected by the fine asperities or edges of the luster material 21 is absorbed and/or shielded by the first blackish pigment 23, and the lightness of the shade is decreased accordingly.

As the first blackish pigment 23 contained in the lustrous layer 14, e.g., carbon black having excellent weather resistance may be employed although the first blackish pigment 23 is not limited thereto. The concentration of the first blackish pigment 23 in the lustrous layer 14 is preferably 1 mass % or more to 20 mass % or less. If the concentration of the carbon black is too low, the light absorbing function and the light hiding power might not be sufficiently obtained. On the other hand, if the concentration of the carbon black is too high, a structure formed of aggregated primary particles is likely to be in a mechanically entangled state, and light scattering increases. For this reason, transparency might be degraded, and the lightness of the shade might increase. Thus, the concentration of the carbon black in the lustrous layer 14 is set within the above-described range, and it is advantageous in decreasing the lightness of the shade.

The average particle size of the carbon black is preferably 200 nm or less. Since the average particle size of the carbon black is ½ of the lower wavelength limit (a wavelength of 400 nm) of visible light, light scattering due to the carbon black particles can be reduced. Thus, an increase in the lightness of the shade can be suppressed.

The lustrous layer 14 may contain a coloring agent of a color other than blackish color, such as a reddish coloring agent. Accordingly, light scattering can be reduced. From the viewpoint of a great FT value, only the blackish coloring agent is preferably contained as the coloring agent.

In order to adjust the light reflection properties, a black base layer or other dark base layers (absorbing layers) absorbing light may be provided between the lustrous layer 14 and the electrodeposition coating film 13. That is, this is a method in which light having penetrated the gap between the particles of the luster material 21 in the lustrous layer 14 is absorbed by the dark base layer. In the case of this method, it is necessary to coat the dark base layer, but it is possible to adjust the reflection properties.

<Reflection Properties of Lustrous Layer>
[Y Value]

The Y value of the XYZ colorimetric system is Y of tristimulus values X, Y, Z defined by the following equations in the CIEXYZ color space (https://ja.wikipedia.org/wiki/CIE_1931_% E8%89% B2% E7% A9% BA % E9%96%93), and is a stimulus value indicating a luminance (luminous reflectance).

$$X = \int_{380}^{780} L_{e,\Omega,\lambda}(\lambda)\bar{x}(\lambda)d\lambda,$$

$$Y = \int_{380}^{780} L_{e,\Omega,\lambda}(\lambda)\bar{y}(\lambda)d\lambda,$$

$$Z = \int_{380}^{780} L_{e,\Omega,\lambda}(\lambda)\bar{z}(\lambda)d\lambda, \quad \text{[Equation 1]}$$

Note that $x(\lambda)$, $y(\lambda)$, and $z(\lambda)$ (upper bars thereof are omitted) are CIE color-matching functions, and Le, $\Omega$, and $\lambda$ are the spectral radiances of colors measured by a colorimetric observer.

Figure 3:
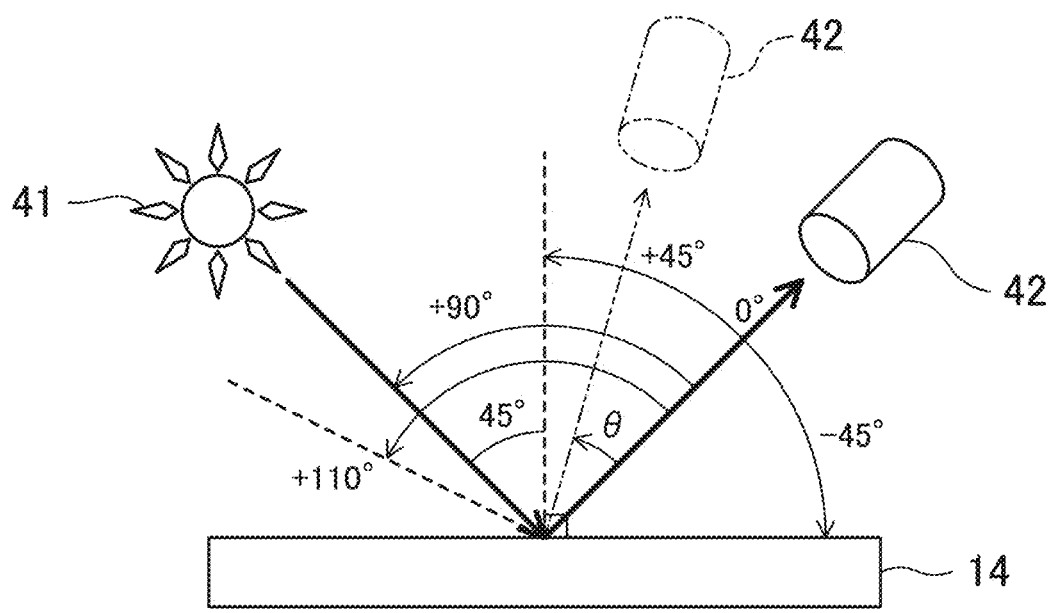
FIG. 3 is a view for describing a method for measuring the Y value, L value, and spectral reflectance of the lustrous layer.

FIG. 3 shows a method for measuring the Y value of the lustrous layer 14. The light incident angle of a light source 41 with respect to the lustrous layer 14 is 45° (an inclination angle with respect to a line perpendicular to the surface of the lustrous layer 14). The light receiving angle $\theta$ (the angle of inclination toward a light source side from a specular reflection direction) of a sensor 42 is 0°. A three-dimensional gonio-spectrophotometric color measurement system GCMS-4 from Murakami Color Research Laboratory was used to measure the values.

In the present embodiment, in order to increase the FI value, a reflection intensity Y(5°) at a light receiving angle of 5° and the decrease rate k of the reflection intensity when the light receiving angle changes from 5° to 15° are set within predetermined ranges.

The reflection intensity Y(5°) at a light receiving angle of 5° is an index of a lustrous impression of highlights. The reflection intensity Y(15°) at a light receiving angle of 15° is an index of whether or not the hue of the reddish pigment 25 clearly appears at an observation angle slightly shifted from the highlight direction. The decrease rate k is expressed by a coefficient k of Y(15°)=k×Y(5°).

The lustrous layer 14 has a Y(5°) of 30 or more to 700 or less, preferably 150 or more to 500 or less, more preferably 200 or more to 400 or less, particularly preferably 200 or more to 300 or less. The coefficient k is 0.01 or more to 0.3 or less, preferably 0.03 or more to 0.2 or less, more preferably 0.05 or more to 0.15 or less. The reflection properties of the lustrous layer 14 are set as described above so that the reddish pigment 25 of the colored layer 15 can vividly appear due to the reflected light from the lustrous layer 14. As a result, the hue of the reddish pigment 25 appears clearly, and the FF properties are enhanced.

Figure 4:
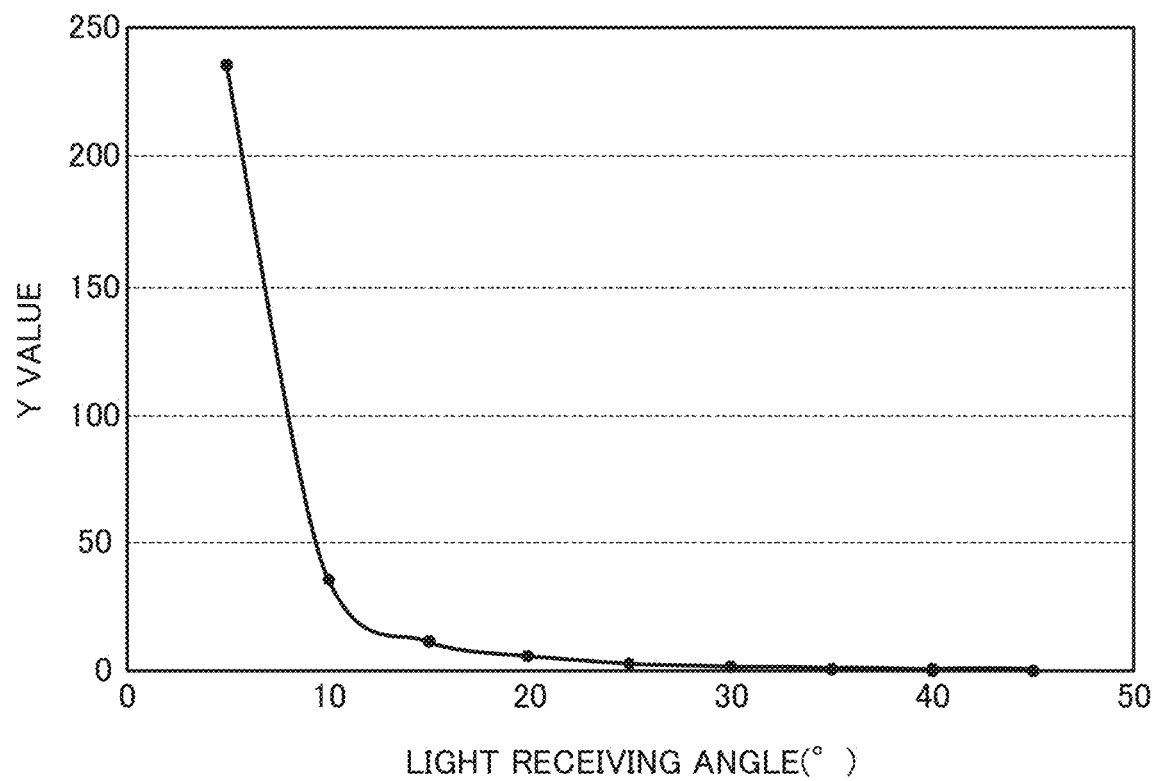
FIG. 4 is a graph showing a relationship between the Y value and light receiving angle of the lustrous layer of Manufacturing Example 1.

Specifically, FIG. 4 shows a relationship between the light receiving angle and the Y value, which is calibrated with a standard white plate, of the XYZ colorimetric system of the lustrous layer 14 (Table 1) of Manufacturing Example 1 above. When the Y value of the reflected light measured at a light receiving angle of 5° is Y(5°) and the Y value of the reflected light measured at a light receiving angle of 15° is Y(15°), Y(5°)=236 and Y(15°)=13.1 in the example of FIG. 4.

[L* Value]

An L* value is the index of the lightness of an L*a*b* color colorimetric system. The L* value can be measured by a method similar to that for the Y value.

Assuming that the light incident angle is 45° with respect to the lustrous layer 14 as illustrated in FIG. 3, the L* value which is the index of the lightness of the reflected light measured at the light receiving angle $\theta$ is defined as L*($\theta$). In this case, in the present embodiment, L*($\theta$) at 45°≤$\theta$≤80° and 100°≤$\theta$≤110° is 10 or less, preferably 5 or less. A light receiving angle of 90° is difficult to be measured because the reflected light overlaps the incident light. For this reason, measurement is not performed for a range of 80°<$\theta$<100°. The lightness in the shade direction (45°≤$\theta$≤80° and 100°≤$\theta$≤110°) is set to 10 or less, preferably 5 or less, and therefore, a sufficient darkness of the shade can be ensured.

Figure 5:
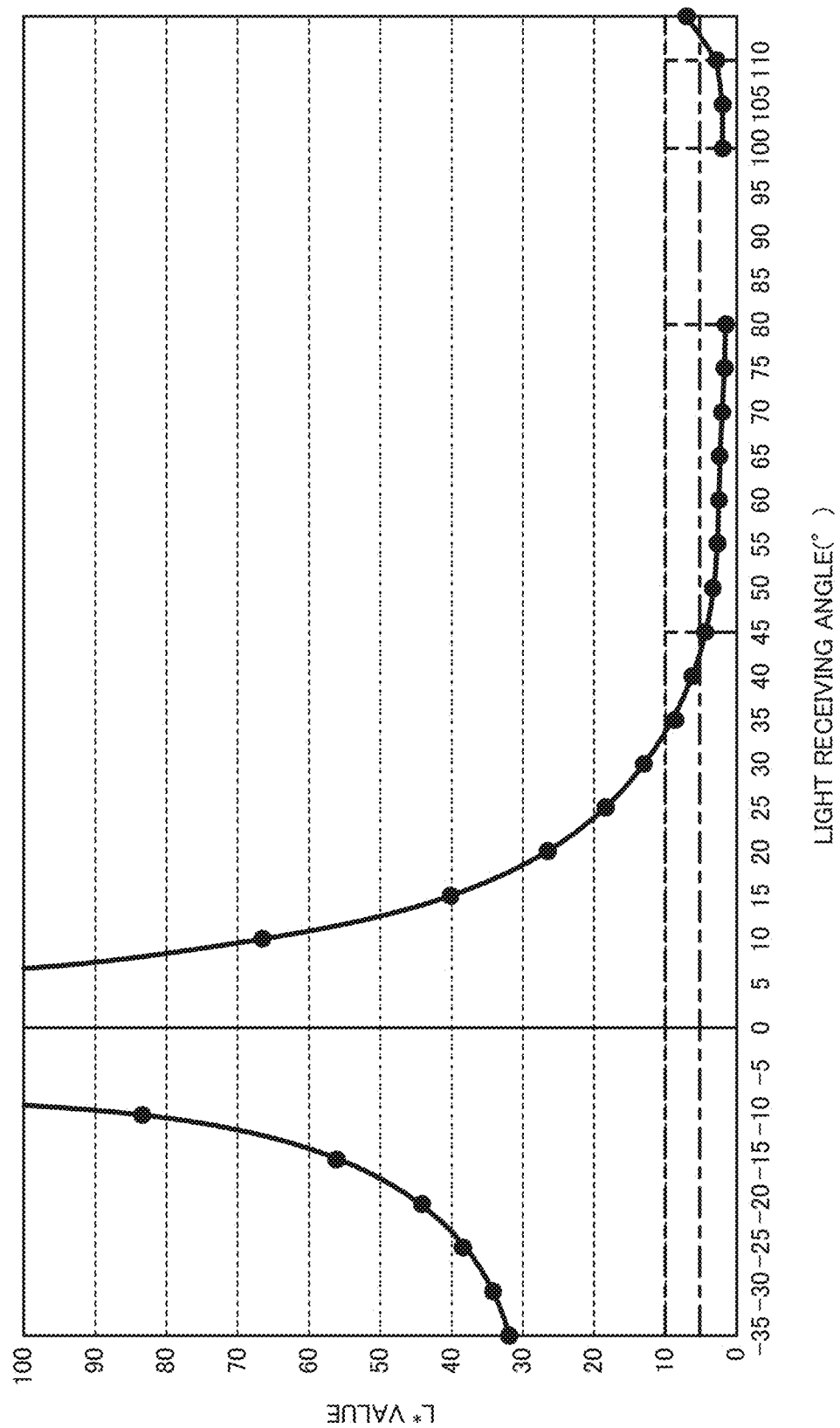
FIG. 5 is a graph showing a relationship between the $L^*$ value and light receiving angle of the lustrous layer of Manufacturing Example 1.

Specifically, FIG. 5 is a graph showing a relationship between the light receiving angle $\theta$ and the L* value of the lustrous layer 14 of Manufacturing Example 1. As shown in FIG. 5, when the light receiving angle is 45°≤$\theta$≤80° and 100°≤$\theta$≤110°, the L value is 5 or less.

The L*($\theta$) at 45°≤$\theta$≤80° and 100°≤$\theta$≤110° may satisfy a condition of 10 or less in a case where the lustrous layer 14 contains a reddish coloring agent in addition to the first blackish pigment 23.

[Spectral Reflectance]

The spectral reflectance indicates the wavelength dependence of the reflectance. The spectral reflectance of the lustrous layer 14 can be measured by a method similar to those for the Y value and the L* value.

In the present embodiment, the spectral reflectance, which is measured at a light incident angle of 45° and a light receiving angle $\theta$ of 45° and 110° (a typical shade direction), of the lustrous layer 14 for the standard white plate in a wavelength range of 450 nm to 700 nm is 0.02 or less, preferably 0.01 or less in absolute value.

Figure 6:
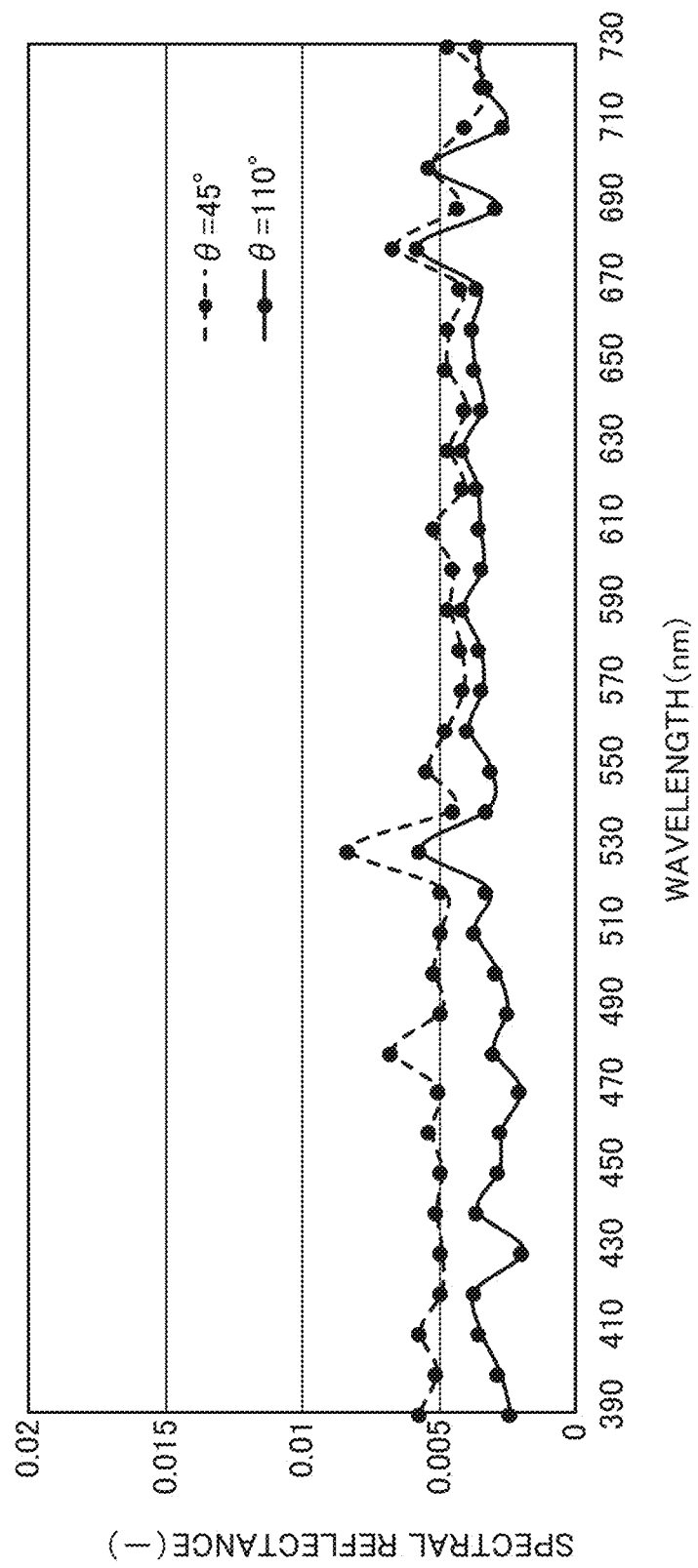
FIG. 6 is a graph showing a relationship between a wavelength and the spectral reflectance of the lustrous layer of Manufacturing Example 1.

Specifically, FIG. 6 is a graph showing a relationship between the wavelength and the spectral reflectance of the lustrous layer 14 of Manufacturing Example 1. As shown in FIG. 6, the spectral reflectance in a wavelength of 450 nm to 700 nm is 0.01 or less at a light receiving angle of 45° and 110°. Accordingly, a sufficient darkness of the shade can be obtained.

Note that the spectral reflectance may be 0.02 or less in a case where the lustrous layer 14 contains a reddish coloring agent in addition to the first blackish pigment 23.

<Colored Layer>
[Reddish Pigment]

The reddish pigment 25 to be used may include, for example, an organic pigment such as perylene red, dibromoanthanthrone red, azo red, anthraquinone red, quinacridone red, or diketopyrrolopyrrole, and perylene red, having excellent weather resistance, is particularly preferably used.

Although the details will be described later, the average particle size of the reddish pigment 25 is preferably 2 nm or more to 160 nm or less, more preferably 2 nm or more to 30 nm or less.

Since the average particle size of the reddish pigment is 160 nm or less, there is no geometric optical scattering or Mie scattering due to the pigment particles. Since the average particle size is 2 nm or more, Rayleigh scattering is also avoided. Thus, it is advantageous in producing clear and vivid red. In addition, the average particle size is small, and therefore, if the same pigment concentration is applied, the frequency of light contacting pigment particles and being absorbed by the pigment particles when the light penetrates the colored layer is higher than that in a case where the pigment particle size is large. Thus, the light is more greatly attenuated. When the light attenuation increases, the amount of light penetrating the colored layer 15 decreases, and the overall lightness decreases. However, since the amount of light in the highlight direction is originally great, influence of the light attenuation on the lightness is small. On the other hand, since the amount of light in the shade direction is originally small, the influence of the light attenuation on the lightness is great. The size of the pigment particles is reduced, and a great FI value is obtained. Thus, it is advantageous in obtaining a high level of metallic impression.

The concentration of the reddish pigment 25 in the colored layer 15 is 1 mass % or more to 17 mass % or less, preferably 4 mass % or more to 10 mass % or less, more preferably 5 mass % or more to 9 mass % or less, particularly preferably 5 mass % or more to 7 mass % or less.

If the concentration of the reddish pigment 25 in the colored layer 15 is less than 1 mass %, the color of red cannot be sufficiently produced in the highlight. If the concentration of the reddish pigment 25 exceeds 17 mass %, an effect of the pigment particles absorbing and/or shielding the reflected light increases and the lightness of the highlight decreases, and the lightness of the shade increases due to an effect of the pigment particles scattering light. Thus, the FI value decreases.

[Second Blackish Pigment]

Since the colored layer 15 contains the second blackish pigment 27, the light reflected on the luster material 21 of the lustrous layer 14 is absorbed by the second blackish pigment 27 over the entire wavelength when the reflected light penetrates the colored layer 15. Since the amount of light is small in the shade direction, the amount of reflected light penetrating the colored layer 15 is greatly reduced when the light is absorbed by the second blackish pigment 27. On the other hand, since the amount of reflected light is great in the highlight, the amount of reflected light penetrating the colored layer 15 is sufficiently ensured even if part of the reflected light is absorbed by the second blackish pigment 27. Thus, the vehicle body 11 provided with the multilayer coating film 12 looks jet-black in the shade while looking vivid red in the highlight, and a high-design metallic color is obtained.

The second blackish pigment 27 to be employed may include, but not limited to, carbon black having excellent weather resistance, for example.

The average particle size of the carbon black is preferably 20 nm or more to 160 nm or less. Since the average particle size of the carbon black is ½ of the lower wavelength limit (a wavelength of 400 nm) of visible light, light scattering due to the carbon black particles can be reduced.

The concentration of the second blackish pigment 27 in the colored layer 15 is preferably 6 mass % or less. The percentage of the second blackish pigment 27 with respect to the total amount of the reddish pigment 25 and the second blackish pigment 27 in the colored layer 15 is preferably 26 mass % or less.

If the concentration of the second blackish pigment 27 and/or the percentage of the second blackish pigment 27 in the coloring agent are/is too high, the amount of reflected light absorbed increases, and therefore, the blackness of the highlight excessively increases and the color of red in the highlight dulls. The concentration of the second blackish pigment 27 and/or the percentage of the second blackish pigment 27 in the coloring agent are/is set within the above-described range(s) so that an excessive increase in the blackness of the highlight can be suppressed and the dullness of the color of red can be reduced. Accordingly, vivid red in the highlight can be produced.

[Entire Coloring Agent]

The total amount of all the coloring agents contained in the colored layer 15, i.e., the total amount of the reddish pigment 25 and the arbitrary second blackish pigment 27, is preferably 1 mass % or more to 23 mass % or less.

The light transparency of the colored layer 15 varies depending on the concentration of the coloring agent contained in the colored layer 15. Particularly, if the concentration of all the coloring agents in the colored layer is low, the reflected light from the lustrous layer, particularly the diffuse-reflected light, is not attenuated much when penetrating the colored layer, and the lightness of the shade increases. Accordingly, the FI value decreases. On the other hand, if the concentration of all the coloring agents is 1 mass % or more, the diffuse-reflected light is sufficiently absorbed by the pigment particles when penetrating the colored layer 15. Thus, the lightness of the shade decreases, and the FI value increases. If the concentration of all the coloring agents is excessively high, an effect of the pigment particles absorbing and/or shielding the reflected light from the lustrous layer 14 increases, and the lightness of the highlight decreases. Accordingly, the FI value decreases. In addition, light scattering due to the pigment particles also causes an increase in the lightness of the shade and therefore causes a decrease in the FI value. Thus, the upper limit of the concentration of all the coloring agents is preferably 23 mass %.

<Light Transparency of Colored Layer>

[Spectral Transmittance]

The light transparency of the colored layer 15 is represented by, for example, the spectral transmittance thereof. The spectral transmittance of the colored layer 15 is a value obtained by dividing the spectral reflectance measured in a state in which the colored layer 15 is layered on the lustrous layer 14 by the spectral reflectance measured in a state in which the colored layer 15 is removed and the surface of the lustrous layer 14 is exposed, and is represented here by an absolute value. The spectral reflectance measured in a state in which the colored layer 15 is layered on the lustrous layer 14 may be measured on a coating film in a state in which the colored layer 15 is layered on the lustrous layer 14 in the method illustrated in FIG. 3.

When the spectral transmittance spectrum of the colored layer 15 is obtained, the incident angle in the measurement of each spectral reflectance is 45°, and the light receiving angle is 15° at which the red hue appears clearly.

In the case of the reddish coloring agent, the spectral reflectance rises in a wavelength range of 590 nm to 650 nm, and therefore, the slope of the tangent of the spectrum at a median of 620 nm in the wavelength range is set within a predetermined range.

That is, in the colored layer 15 of the present embodiment, the slope of the tangent of the spectral transmittance spectrum at 620 nm is 0.02 nm$^{-1}$ or more to 0.06 nm$^{-1}$ or less, and preferably 0.03 nm$^{-1}$ or more to 0.06 nm$^{-1}$ or less.

Figure 7:
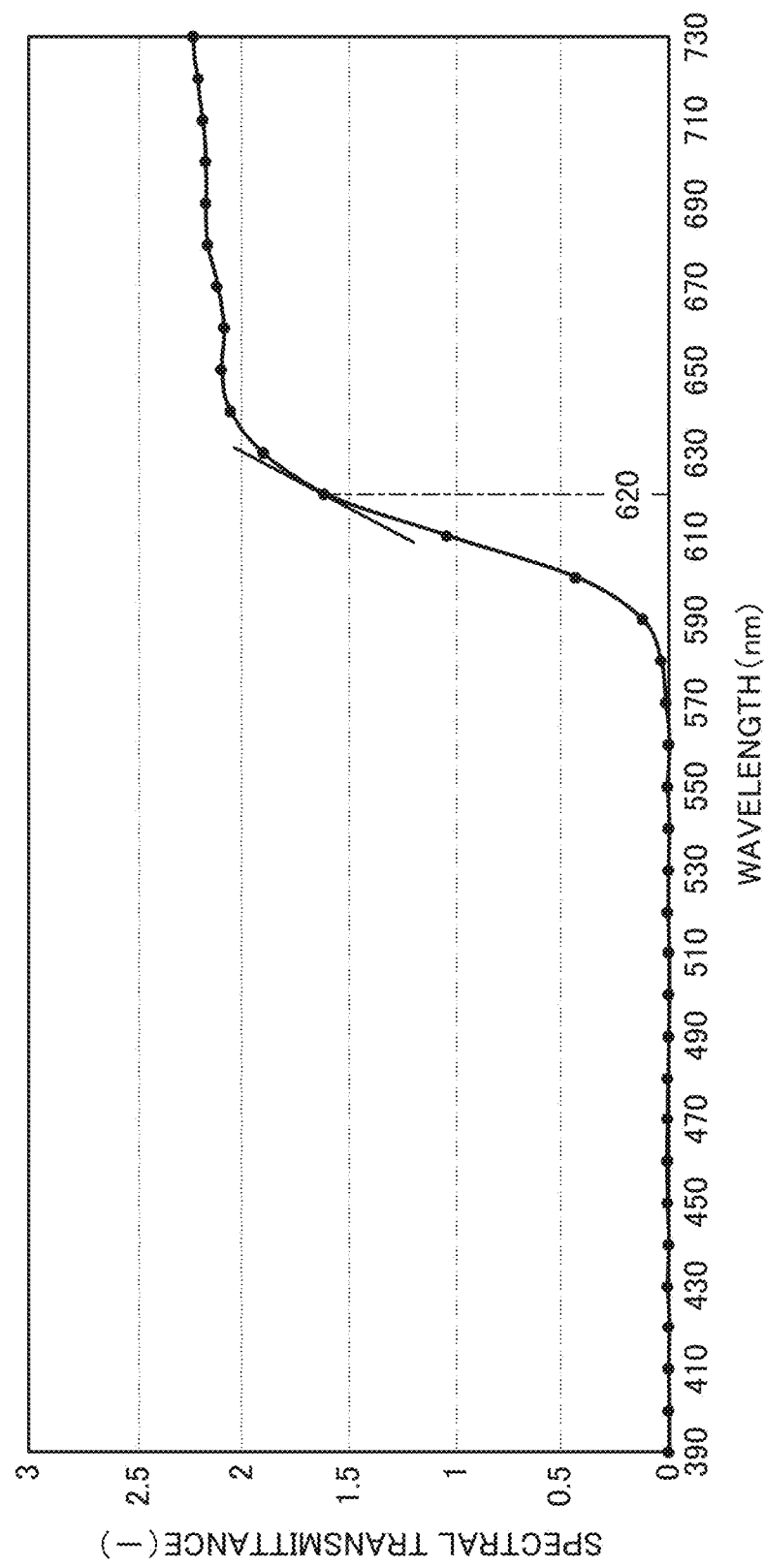
FIG. 7 is a graph showing a relationship between the wavelength and the spectral transmittance of a colored layer of a coated plate of Example 3.

Specifically. FIG. 7 shows the spectrum of the spectral transmittance of the colored layer 15 in a coated plate F (Example 3) shown in Table 2. A gonio-spectrophotometric color measurement system GCMS-4 from Murakami Color Research Laboratory was used to measure the spectral reflectance. FIG. 7 is a spectral transmittance spectrum in a measurement wavelength range of 390 to 730 nm. The specifications of a multilayer coating film 12 of the coated plate F (Example 3) and the slope of the tangent of the spectrum at a wavelength of 620 nm are as shown in Table 2.

TABLE 2

|  |  |  | A | B | C | D | E | F (Ex. 3) | G |
|---|---|---|---|---|---|---|---|---|---|
|  | Lustrous Layer |  |  |  |  | Manufacturing Example 1 |  |  |  |
| Colored Layer | Perylene Red | Concentration (mass %) | 5.9 | 5.9 | 5.9 | 5.9 | 5.9 | 5.9 | 5.9 |
|  |  | Average Particle Size (µm) | 200 | 160 | 100 | 50 | 25 | 20 | 10 |
|  | Acrylic Resin | Concentration (mass %) | 42.4 | 42.4 | 42.4 | 42.4 | 42.4 | 42.4 | 42.4 |
|  | Polyester Resin | Concentration (mass %) | 9 | 9 | 9 | 9 | 9 | 9 | 9 |
|  | Urethane Resin | Concentration (mass %) | 3 | 3 | 3 | 3 | 3 | 3 | 3 |
|  | Melamine Resin | Concentration (mass %) | 21 | 21 | 21 | 21 | 21 | 21 | 21 |
|  | Additive | Concentration (mass %) | 18.7 | 18.7 | 18.7 | 18.7 | 18.7 | 18.7 | 18.7 |

Next, as shown in Table 2, a plurality of coated plates A to E and G having the same configuration as that of the coated plate F (Example 3) except for the pigment particle size of the colored layer 15 were produced, and the spectral transmittance spectrum of each coated plate was measured. In addition, the slope of the tangent at 620 nm was obtained from the spectral transmittance spectrum as described above, and the XY and Z values of the XYZ colorimetric system were obtained using the color-matching function. XYZ was converted into L*a*b*, and a chroma $C^* = \sqrt{(a^*)^2 + (b^*)^2}$ was obtained.

Figure 8:
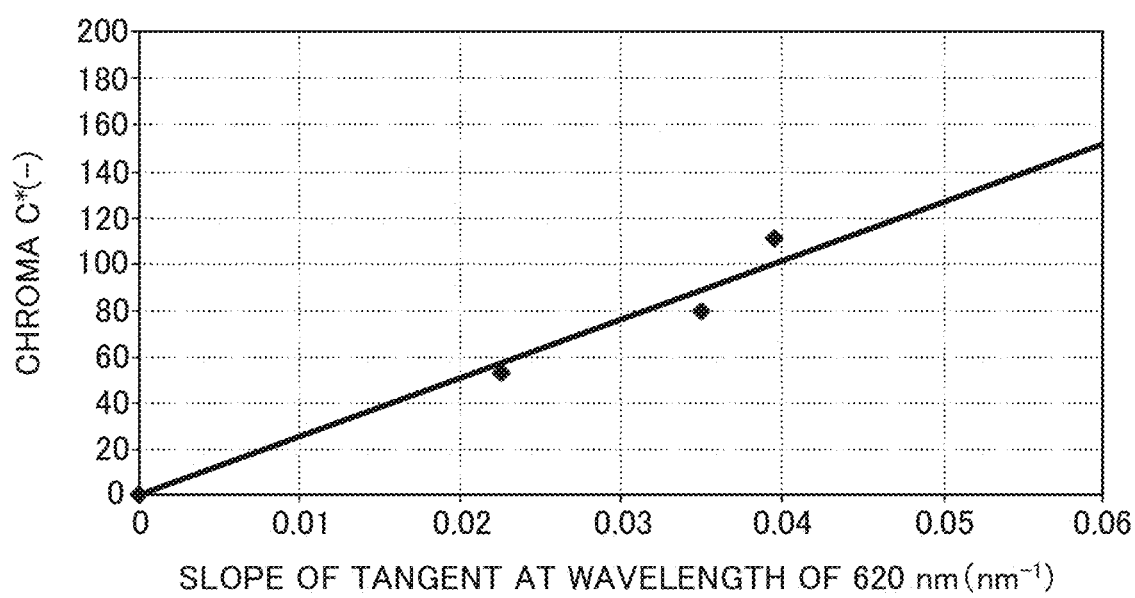
FIG. 8 is a graph showing a relationship between a chroma $C^*$ and the slope of the tangent of a spectral transmittance spectrum at 620 nm.

According to the study conducted by the present disclosers, the chroma C* is proportional to the slope of the tangent of the spectral transmittance spectrum at a wavelength of 620 nm, as shown in FIG. 8. The chroma C* is approximately 50 at a slope of 0.02 nm$^1$, and is approximately 150 at a slope of 0.06 nm$^{-1}$. Thus, it is considered that when the slope of the tangent is 0.02 nm$^{-1}$ or more, a sufficient chroma C* can be obtained from the viewpoint of producing vivid red with less dullness and higher transparency.

Figure 9:
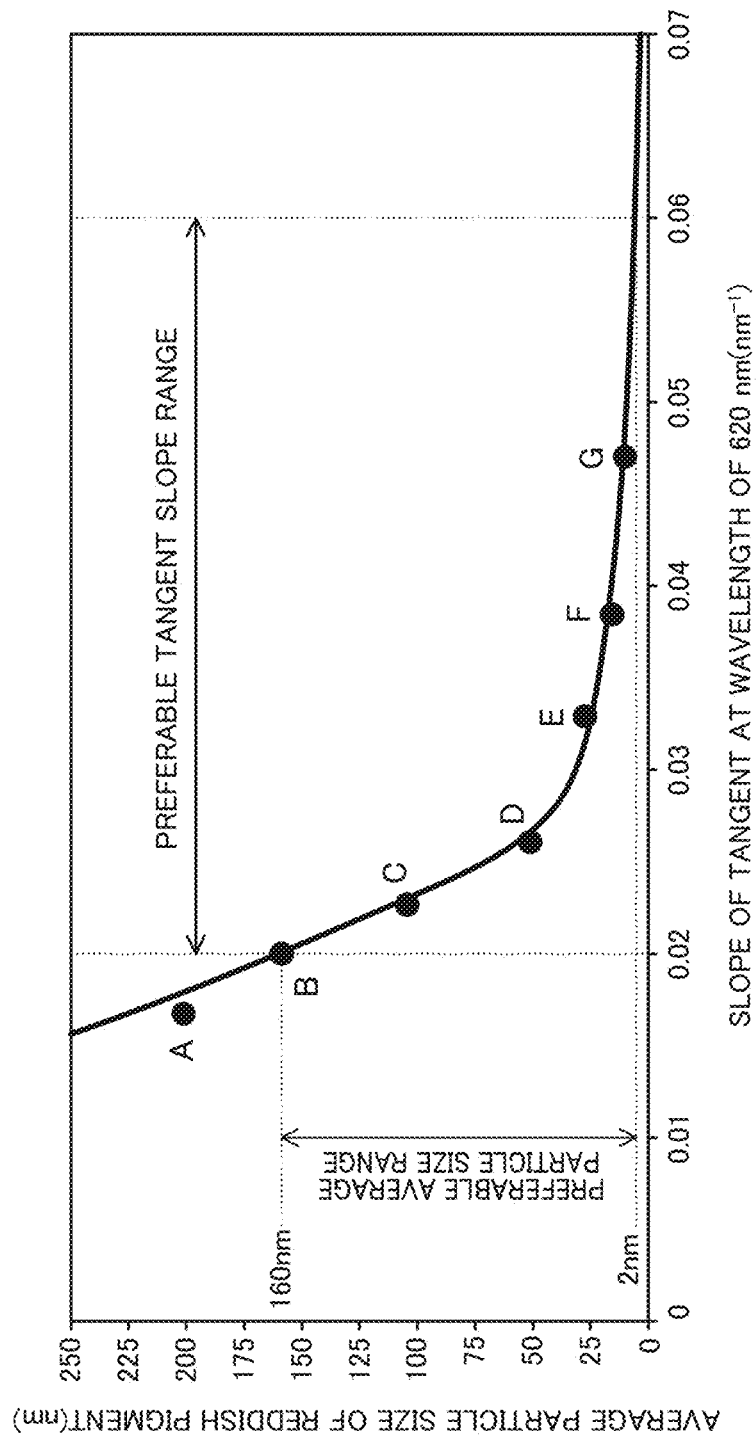
FIG. 9 is a graph showing a relationship between the slope of the tangent of the spectral transmittance spectrum at 620 nm and the average particle size (pigment particle size) of a reddish pigment.

As shown in FIG. 9, the slope of the tangent depends on the average particle size (pigment particle size) of the reddish pigment in the colored layer 15. If the pigment particle size exceeds 160 nm, the transparency is degraded due to irregular reflection due to the pigment particles, i.e., geometric optical scattering or Mie scattering, and there is a possibility that the color is poor in metallic gloss. If the pigment particle size is less than 2 nm, the color of purple might be produced due to Rayleigh scattering. According to FIGS. 8 and 9, when the slope of the tangent is 0.02 nm$^{-1}$ or more to 0.06 nm$^{-1}$ or less, preferably 0.03 nm$^{-1}$ or more to 0.06 nm$^{-1}$ or less, the average pigment particle size is 2 nm or more to 160 nm or less, preferably 2 nm or more to 30 nm or less. Accordingly, the irregular reflection due to the pigment particles and the Rayleigh scattering are avoided, and vivid red is produced with less dullness and higher transparency.

<Optical Properties of Multilayer Coating Film>
[FI Value]

Figure 10:
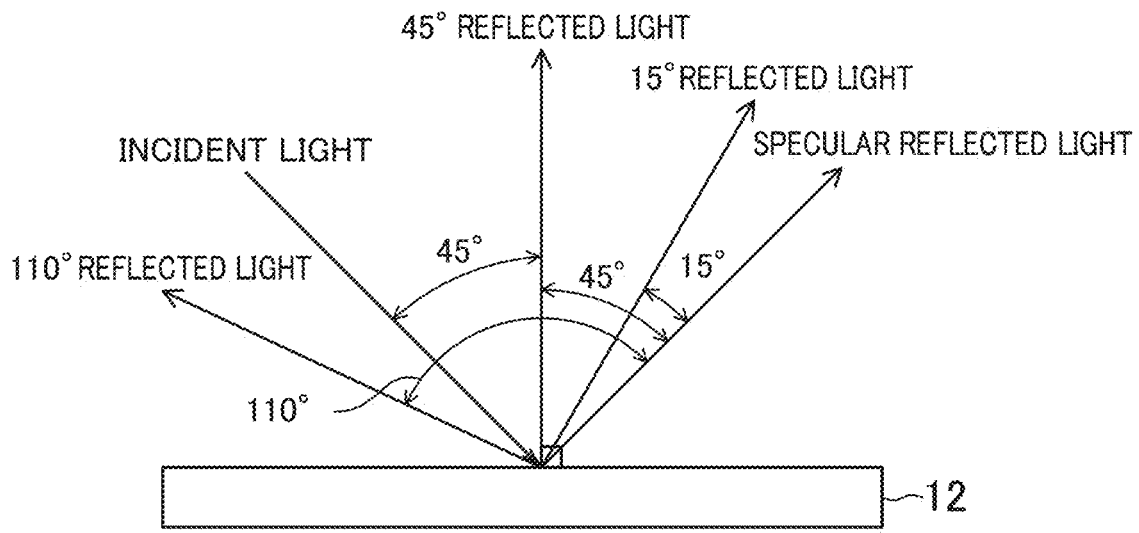
FIG. 10 is a view of reflected light for describing how to calculate an FI value.

The FI value is a metallic appearance index provided by X-Rite, Incorporated, and represents the FF properties. As illustrated in FIG. 10, the FI value is obtained from the following equation, wherein L*45° is the lightness index of reflected light (45° reflected light) at a light receiving angle (the angle of inclination toward the light source side from the specular reflection direction) of 45°, L*15° is the lightness index of reflected light (15° reflected light) at a light receiving angle of 15°, and L*110° is the lightness index of reflected light (110° reflected light) at a light receiving angle of 110° when light enters the surface of the multilayer coating film 12 at an incident angle (the angle with respect to the line perpendicular to the surface) of 45°.

$$FI = 2.69 \times (L^*15° - L^*100°)^{1.11} / L^*45°^{0.86}$$

The FI value is 20 or more, preferably 30 or more, more preferably 35 or more, particularly preferably 40 or more from the viewpoint of obtaining excellent vividness of the color of red in the multilayer coating film 12 and excellent metallic impression of the multilayer coating film 12.

[Combination of Reflection Properties of Lustrous Layer and Light Transparency of Colored Layer]

As described above, the reflection properties of the lustrous layer 14 and the light transparency of the colored layer 15 are combined so that in the multilayer coating film 12 according to the present embodiment, the reddish color can be produced with excellent hue and a great FI value can be obtained.

That is, the combination of the reflection properties of the lustrous layer 14 and the light transparency of the colored layer 15 allows the color of red to be vividly and brightly produced with transparency in the highlight while the lightness decreases on the shade side, whereby the color of red in the highlight becomes more conspicuous and deep and high metallic impression is obtained. As a result, a high-design metallic color having both high vividness and great depth is produced.

EXAMPLES

Coated plates provided with multilayer coating films (a base was an electrodeposition coating film) according to Examples 1 to 17 and Comparative Examples 1 to 4 shown in Tables 3 to 5 were produced. Then, the area ratio of aluminum flakes per unit area, Y(5°), Y(15°), the slope of the tangent of the spectral transmittance spectrum at a wavelength of 620 nm, and the FI value were measured. In addition, the vividness of the color of red and the intensity of the contrast of the color of red were evaluated by a visual appearance test. The visual appearance test was conducted on a four-point scale indicated by a double circle mark, a circle mark, a triangle mark, and a cross mark. In the evaluation of the vividness of the color of red and the intensity of the contrast of the color of red, the double circle mark is the highest score, and the score decreases in a stepwise manner in the order of the circle mark, the triangle mark, and the cross mark.

TABLE 3

|  |  |  | Comparative Example 1 | Examples 1 | 2 | 3 | 4 | 5 | 6 | Comparative Example 2 |
|---|---|---|---|---|---|---|---|---|---|---|
| Lustrous Layer | Aluminum Flakes | Concentration (mass %) | 0.5 | 1 | 3 | 6 | 10 | 14 | 17 | 18 |
|  |  | Area Ratio (%) | 1.8 | 3.6 | 11.1 | 22.5 | 38.2 | 55.1 | 67.6 | 72.1 |
|  | Carbon Black | Concentration (mass %) | 10.8 | 10.8 | 10.8 | 10.8 | 10.8 | 10.8 | 10.8 | 10.8 |
|  | Acrylic Resin | Concentration (mass %) | 16.7 | 16.7 | 16.7 | 16.7 | 16.7 | 16.7 | 16.7 | 16.7 |
|  | Urethane Resin | Concentration (mass %) | 16.3 | 16.3 | 16.3 | 16.3 | 16.3 | 16.3 | 16.3 | 16.3 |
|  | Melamine Resin | Concentration (mass %) | 12.3 | 12.3 | 12.3 | 12.3 | 12.3 | 12.3 | 12.3 | 12.3 |
|  | Additive | Concentration (mass %) | 43.4 | 42.9 | 40.9 | 37.9 | 33.9 | 29.9 | 26.9 | 25.9 |
| Colored Layer | Perylene Red | Concentration (mass %) | 5.9 | 5.9 | 5.9 | 5.9 | 5.9 | 5.9 | 5.9 | 5.9 |
|  |  | Average Particle Size (μm) | 20 | 20 | 20 | 20 | 20 | 20 | 20 | 20 |
|  | Acrylic Resin | Concentration (mass %) | 42.4 | 42.4 | 42.4 | 42.4 | 42.4 | 42.4 | 42.4 | 42.4 |
|  | Polyester Resin | Concentration (mass %) | 9 | 9 | 9 | 9 | 9 | 9 | 9 | 9 |
|  | Urethane Resin | Concentration (mass %) | 3 | 3 | 3 | 3 | 3 | 3 | 3 | 3 |
|  | Melamine Resin | Concentration (mass %) | 21 | 21 | 21 | 21 | 21 | 21 | 21 | 21 |
|  | Additive | Concentration (mass %) | 18.7 | 18.7 | 18.7 | 18.7 | 18.7 | 18.7 | 18.7 | 18.7 |
| Evaluation |  | Y(5°) | 17 | 37 | 117 | 236 | 395 | 555 | 674 | 713 |
|  |  | Y(15°) | 0.4 | 0.6 | 1.4 | 13.1 | 46.4 | 100.1 | 153.6 | 173.6 |
|  |  | k = Y(15°)/Y(5°) | 0.02 | 0.02 | 0.01 | 0.06 | 0.12 | 0.18 | 0.23 | 0.24 |
|  |  | Slope of Tangent (nm$^{-1}$) | 0.04 | 0.04 | 0.04 | 0.04 | 0.04 | 0.04 | 0.04 | 0.04 |
|  |  | FI Value | 16.8 | 20.3 | 23.5 | 48.3 | 35.1 | 28.6 | 22.1 | 15.9 |
|  |  | Visual Appearance Test | X | Δ | Δ | ◎ | ○ | Δ | Δ | X |

TABLE 4

|  |  |  | Comparative Example 3 | Examples 7 | 8 | 9 | 3 | 10 | 11 | 12 | 13 | Comparative Example 4 |
|---|---|---|---|---|---|---|---|---|---|---|---|---|
|  | Lustrous Layer |  | Manufacturing Example 1 | | | | | | | | | |
| Colored Layer | Perylene Red | Concentration (mass %) | 0.5 | 1 | 3 | 4 | 5.9 | 8 | 10 | 14 | 17 | 18 |
|  |  | Average Particle Size (μm) | 20 | 20 | 20 | 20 | 20 | 20 | 20 | 20 | 20 | 20 |
|  | Acrylic Resin | Concentration (mass %) | 42.4 | 42.4 | 42.4 | 42.4 | 42.4 | 42.4 | 42.4 | 42.4 | 42.4 | 42.4 |
|  | Polyester Resin | Concentration (mass %) | 9 | 9 | 9 | 9 | 9 | 9 | 9 | 9 | 9 | 9 |
|  | Urethane Resin | Concentration (mass %) | 3 | 3 | 3 | 3 | 3 | 3 | 3 | 3 | 3 | 3 |
|  | Melamine Resin | Concentration (mass %) | 21 | 21 | 21 | 21 | 21 | 21 | 21 | 21 | 21 | 21 |
|  | Additive | Concentration (mass %) | 24.1 | 23.6 | 21.6 | 20.6 | 18.7 | 16.6 | 14.6 | 10.6 | 7.6 | 6.6 |
| Evaluation |  | Y(5°) | 236 | 236 | 236 | 236 | 236 | 236 | 236 | 236 | 236 | 236 |
|  |  | Y(15°) | 13.1 | 13.1 | 13.1 | 13.1 | 13.1 | 13.1 | 13.1 | 13.1 | 13.1 | 13.1 |
|  |  | k = Y(15°)/Y(5°) | 0.06 | 0.06 | 0.06 | 0.06 | 0.06 | 0.06 | 0.06 | 0.06 | 0.06 | 0.06 |
|  |  | Slope of Tangent (nm$^{-1}$) | 0.01 | 0.02 | 0.023 | 0.025 | 0.04 | 0.035 | 0.03 | 0.027 | 0.022 | 0.017 |
|  |  | FI Value | 12.6 | 20.8 | 28.2 | 31.7 | 48.3 | 38.1 | 32.3 | 28.4 | 22.6 | 18.5 |
|  |  | Visual Appearance Test | X | Δ | Δ | ○ | ◎ | ○ | ○ | Δ | Δ | X |

TABLE 5

|  |  |  | Examples 14 | 15 | 16 | 17 |
|---|---|---|---|---|---|---|
|  | Lustrous Layer |  | Manufacturing Example 1 | | | |
| Colored Layer | Perylene Red | Concentration (mass %) | 5.9 | 5.9 | 5.9 | 5.9 |
|  |  | Average Particle Size (μm) | 20 | 20 | 20 | 20 |
|  | Carbon Black | Concentration (mass %) | 0.5 | 1 | 1.5 | 2 |
|  |  | Average Particle Size (μm) | 50 | 50 | 50 | 50 |
|  | Total Pigment Concentration (mass %) |  | 6.4 | 6.9 | 7.4 | 7.9 |
|  | Carbon Black Percentage (mass %) in Total Pigment |  | 7.9 | 14.6 | 20.4 | 25.4 |

TABLE 5-continued

|  |  |  | Examples | | | |
| --- | --- | --- | --- | --- | --- | --- |
|  |  |  | 14 | 15 | 16 | 17 |
|  | Acrylic Resin | Concentration (mass %) | 42.4 | 42.4 | 42.4 | 42.4 |
|  | Polyester Resin | Concentration (mass %) | 9 | 9 | 9 | 9 |
|  | Urethane Resin | Concentration (mass %) | 3 | 3 | 3 | 3 |
|  | Melamine Resin | Concentration (mass %) | 21 | 21 | 21 | 21 |
|  | Additive | Concentration (mass %) | 18.2 | 17.7 | 17.2 | 16.7 |
| Evaluation |  | Y(5°) | 236 | 236 | 236 | 236 |
|  |  | Y(15°) | 13.1 | 13.1 | 13.1 | 13.1 |
|  |  | k = Y(15°)/Y(5°) | 0.06 | 0.06 | 0.06 | 0.06 |
|  |  | Slope of Tangent ($nm^{-1}$) | 0.032 | 0.029 | 0.026 | 0.022 |
|  |  | FI Value | 33.4 | 29.2 | 25.4 | 21.7 |
|  |  | Visual Appearance Test | ○ | Δ | Δ | Δ |

Figure 11:
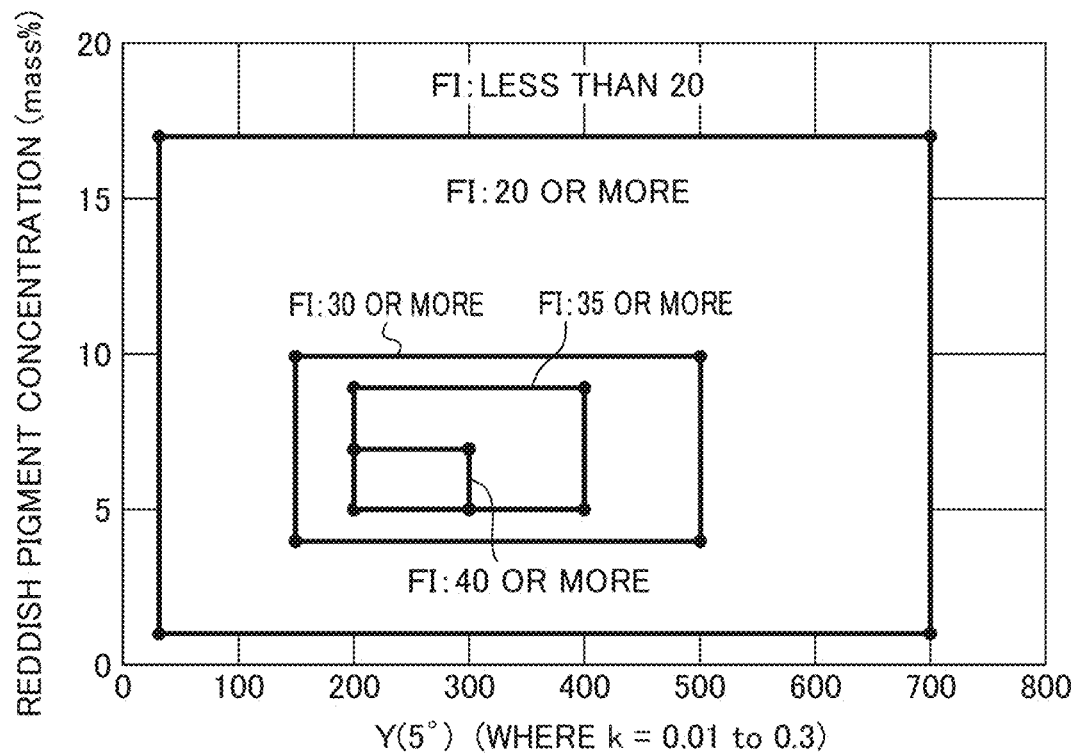
FIG. 11 is a graph showing preferred ranges of $Y(5°)$ and the concentration of the reddish pigment in the colored layer when $Y(15°)=k\times Y(5°)$ (coefficient k=0.01 to 0.3).

FIG. 11 is a graph showing the dependence of the FI value on Y(5°) and the concentration (pigment concentration) of the reddish pigment 25 in the colored layer 15 based on the results shown in Tables 3 and 4. Note that k represented by Y(15°)=k×Y(5°) is 0.01 or more to 0.3 or less.

When the Y(5°) of the lustrous layer 14 is 30 or more to 700 or less and the pigment concentration of the colored layer 15 is 1 mass % or more to 17 mass % or less, the FI value can be 20 or more. When Y(5°) is 150 or more to 500 or less and the pigment concentration of the colored layer 15 is 4 mass % or more to 10 mass % or less, the FI value can be 30 or more. When Y(5°) is 200 or more to 400 or less and the pigment concentration of the colored layer 15 is 5 mass % or more to 9 mass % or less, the FI value can be 35 or more. When Y(5°) is 200 or more to 300 or less and the pigment concentration of the colored layer 15 is 5 mass % or more to 7 mass % or less, the FI value can be 40 or more.

DESCRIPTION OF REFERENCE CHARACTERS

11 Vehicle Body
11A Steel Plate
12 Multilayer Coating Film
13 Electrodeposition Coating Film
14 Lustrous Layer
15 Colored Layer
16 Transparent Clear Layer
21 Luster Material
23 First Blackish Pigment (Blackish Coloring Agent)
25 Reddish Pigment (Reddish Coloring Agent)
27 Second Blackish Pigment (Blackish Coloring Agent)

The invention claimed is:

1. A multilayer coating film comprising:
a lustrous layer directly or indirectly formed on a surface of a coating target and containing a luster material and a coloring agent; and
a colored layer stacked on the lustrous layer, containing a reddish coloring agent, and having translucency, wherein
regarding a Y value of an XYZ colorimetric system calibrated with a standard white plate, when a light incident angle (an angle with respect to a line perpendicular to a surface of the lustrous layer) is 45°, Y (5°) represents a Y value of reflected light measured at a light receiving angle (the angle of inclination toward a light source side from a specular reflection direction) of 5°, and Y (15°) represents a Y value of reflected light measured at a light receiving angle of 15°, the lustrous layer satisfies the following:
Y (5°) is 30 or more to 700 or less;
Y (15°)=k×Y (5°) (where k is a coefficient); and
k is 0.01 or more to 0.3 or less,
a concentration of the reddish coloring agent in the colored layer is 1 mass % or more to 17 mass % or less, and
the coloring agent in the lustrous layer consists of a blackish coloring agent, a concentration of the blackish coloring agent in the lustrous layer being 1 mass % or more to 20 mass % or less.

2. The multilayer coating film of claim 1, wherein
the lustrous layer contains, as the luster material, aluminum flakes having an average particle size of 5 μm or more to 30 μm or less and an average thickness of 10 nm or more to 500 nm or less, and
a concentration of the aluminum flakes in the lustrous layer is 1 mass % or more to 17 mass % or less.

3. The multilayer coating film of claim 2, wherein
the concentration of the reddish coloring agent in the colored layer is 4 mass % or more to 10 mass % or less.

4. The multilayer coating film of claim 2, wherein
the colored layer contains a reddish pigment as the reddish coloring agent, and
a slope of a tangent of a spectrum of a spectral transmittance, defined as an absolute value, of the colored layer at the wavelength of 620 nm is 0.02 $nm^{-1}$ or more and 0.06 $nm^{-1}$ or less, the spectral transmittance being obtainable by dividing a spectral reflectance measured for the colored layer stacked on the lustrous layer at the light receiving angle of 15° in the case of the light incident angle of 45°, by a spectral reflectance measured for the lustrous layer from which the colored layer is removed and a surface of which is therefore exposed, at the light receiving angle of 15° in the case of the light incident angle of 45°.

5. The multilayer coating film of claim 2, wherein
the colored layer further contains a blackish coloring agent.

6. The multilayer coating film of claim 5, wherein
a percentage of the blackish coloring agent with respect to a total of the reddish coloring agent and the blackish coloring agent is 26 mass % or less.

7. The multilayer coating film of claim 2, wherein
the aluminum flakes have a surface roughness Ra of 50 nm or less.

8. The multilayer coating film of claim 7, wherein
the colored layer further contains a blackish coloring agent.

9. The multilayer coating film of claim 8, wherein
a percentage of the blackish coloring agent with respect to a total of the reddish coloring agent and the blackish coloring agent is 26 mass % or less.

10. The multilayer coating film of claim 1, wherein
the concentration of the reddish coloring agent in the colored layer is 4 mass % or more to 10 mass % or less.

11. The multilayer coating film of claim 1, wherein
the colored layer contains a reddish pigment as the reddish coloring agent, and
a slope of a tangent of a spectrum of a spectral transmittance, defined as an absolute value, of the colored layer at the wavelength of 620 nm is 0.02 $nm^{-1}$ or more and 0.06 $nm^{-1}$ or less, the spectral transmittance being obtainable by dividing a spectral reflectance measured for the colored layer stacked on the lustrous layer at the light receiving angle of 15° in the case of the light incident angle of 45°, by a spectral reflectance measured for the lustrous layer from which the colored layer is removed and a surface of which is therefore exposed, at the light receiving angle of 15° in the case of the light incident angle of 45°.

12. The multilayer coating film of claim 11, wherein
an average particle size of the reddish pigment is 2 nm or more to 160 nm or less.

13. The multilayer coating film of claim 12, wherein
the slope of the tangent is 0.03 $nm^{-1}$ or more to 0.06 $nm^{-1}$ or less.

14. The multilayer coating film of claim 11, wherein
the slope of the tangent is 0.03 $nm^{-1}$ or more to 0.06 $nm^{-1}$ or less.

15. The multilayer coating film of claim 1, wherein
the colored layer further contains a blackish coloring agent.

16. The multilayer coating film of claim 15, wherein
a concentration of the blackish coloring agent in the colored layer is 6 mass % or less.

17. The multilayer coating film of claim 16, wherein
a percentage of the blackish coloring agent with respect to a total of the reddish coloring agent and the blackish coloring agent is 26 mass % or less.

18. The multilayer coating film of claim 15, wherein
a percentage of the blackish coloring agent with respect to a total of the reddish coloring agent and the blackish coloring agent is 26 mass % or less.

19. A coated article comprising: the multilayer coating film of claim 1.

20. A coated article comprising: the multilayer coating film of claim 2.

* * * * *